United States Patent [19]

Hagen et al.

[11] Patent Number: 4,839,841

[45] Date of Patent: Jun. 13, 1989

[54] PROGRAMMABLE DIGITAL MULTIPLE EVENT GENERATOR

[75] Inventors: Michael S. Hagen, Vancouver, Wash.; Keith A. Taylor, Portland; Ira G. Pollock, Beaverton, both of Oreg.

[73] Assignee: Tektronix, Inc., Beaverton, Oreg.

[21] Appl. No.: 150,674

[22] Filed: Feb. 1, 1988

[51] Int. Cl.[4] .......................... G06F 7/04; H03B 29/00
[52] U.S. Cl. .................................. 364/717; 340/146.2
[58] Field of Search .......................... 364/717; 331/98; 340/146.2

[56] References Cited

U.S. PATENT DOCUMENTS

| | | | |
|---|---|---|---|
| 4,213,101 | 7/1980 | Policand et al. | 364/717 |
| 4,511,988 | 4/1985 | Michel et al. | 364/717 |
| 4,516,217 | 5/1985 | Starner | 364/717 |

Primary Examiner—David H. Malzahn
Attorney, Agent, or Firm—Boulden G. Griffith

[57] ABSTRACT

A multiple digital event generator produces events with timing that is programmable, yet the event generator requires a minimum of circuitry for its construction and is capable of operating at very high speeds. A linear feedback shift register is used to produce an arbitrary sequence of non-repeating binary numbers. These numbers are then monitored by one or more digital comparators whose other digital input is chosen so as to cause the desired event to occur when a certain number in the number sequence occurs. The minimum time between events and the maximum range of event control timing is adjustable by varying the frequency of the clock input to the linear feedback shift register. Maximum speed is achieved by using one set of the shift register flip-flop outputs (Q or Q-not) for internal feedback and the other set (Q-not or Q) for the output to the digital comparators, so that the speed of operation of the shift register is not degraded by the load of the multiple digital comparator circuits on its output.

16 Claims, 2 Drawing Sheets

PROGRAMMABLE DIGITAL MULTIPLE EVENT GENERATOR

BACKGROUND OF THE INVENTION

This invention relates to the field of digital event generators, and more particularly to digital event generators that can produce multiple events with variable timing relationships. The term "event" is used here to mean the initiation of a signal having some significance elsewhere in the system, generally for timing and control purposes.

Producing a sequence of digital events with programmable timing relationships to a reference signal is not new. Multiple independent timers or counters can be used to generate a sequence of events with a controllable timing relationship, but this approach is circuitry intensive and is less than optimal in terms of the speeds that can be attained. An approach that reduces the circuitry involved and is capable of faster operation is a circuit consisting of a binary counter and a plurality of digital comparators to monitor the count from the counter and generate the events when particular counts are reached. This approach reduces the total circuitry required and permits the timing of the events to be controlled by selecting different values for the counter output to be compared to. However, the maximum frequency attainable using this approach is limited by the inherent speed limitations of the type of counter used.

What is desired is a circuit that will generate multiple digital event signals, whose timing relationships to a reference signal can be controlled, that will operate at the highest possible speed and yet require a minimum amount of circuitry.

SUMMARY OF THE INVENTION

The present invention is a multiple digital event generator that produces events with timing that is programmable, yet the event generator requires a minimum of circuitry for its construction and is capable of operating at very high speeds. This event generator uses a linear feedback shift register to produce an arbitrary sequence of non-repeating binary numbers. These numbers are then monitored by one or more digital comparators whose other digital input is chosen so as to cause the desired event to occur when a certain number in the number sequence occurs. The minimum time between events and the maximum range of event control timing are adjustable by varying the frequency of the clock input to the linear feedback shift register. Maximum speed is achieved by using one set of the shift register flip-flop outputs for internal feedback and the other set for the output to the digital comparators, thus the speed of operation of the shift register is not degraded by the load of the multiple digital comparator circuits on its output.

DESCRIPTION OF THE PREFERRED EMBODIMENT

Figure 1:
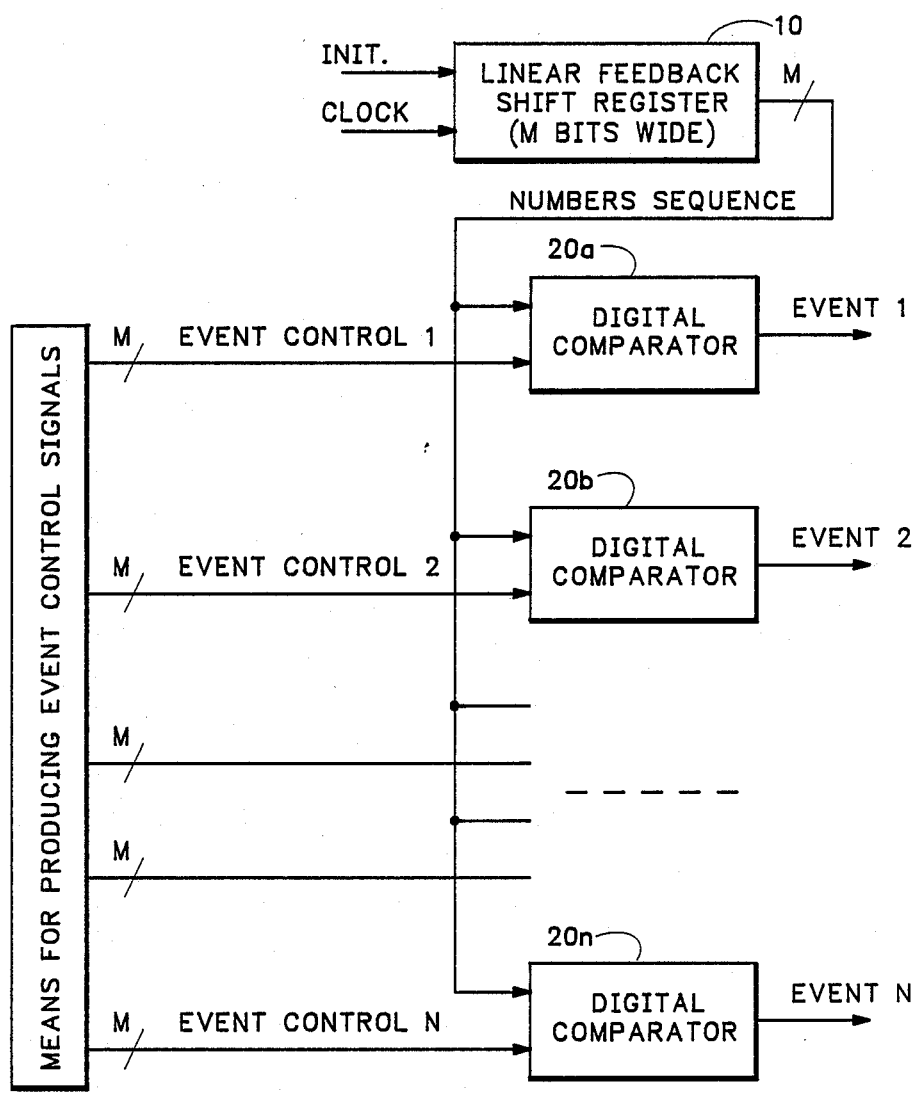
FIG. 1 is a block diagram of a programmable multiple event generator of the invention.

Referring to FIG. 1, a linear feedback shift register 10 has two inputs, a clock signal and an initialization signal. The linear feedback shift register produces an arbitrary sequence of non-repeating binary numbers at its output. These output numbers contain as many bits (m) as the length of the shift register.

The output of the linear feedback shift register (m bits wide) is applied to one of the inputs of each of a number (n) of digital comparators 20. Event control signals (1 to n, each also m bits wide) are applied to the other inputs of each of these digital comparators 20. Each digital comparator 20 produces an event signal at its output when the number on its input from the linear feedback shift register matches the event control signal number on its other input.

The linear feedback shift register 10 is initialized to a known starting condition by the input signal INIT. The linear feedback shift register 10 then progresses through a sequence of non-repeating binary numbers upon each occurrence of the clock signal at its other input. The number of numbers in this sequence is $2\exp M - 1$ for linear feedback shift registers of most lengths. The amount of time that its takes for this sequence to be completed and begin to recur is controlled by the frequency of the clock input. A full sequence need not be completed before a new one is started; i.e., a new sequence may be started at any time by the occurrence of the INIT signal To cause a particular event output to occur at a desired time interval after the occurrence of the INIT signal, an event control signal controller (not shown) applies a number to the event control lines of the appropriate digital comparator 20 that corresponds to the number in the number sequence that will occur at the desired time. The location in the sequence that corresponds to this number may be calculated by dividing the clock period into the desired time. The number that corresponds to that location in the number sequence is then applied to the event control lines of the digital comparator 20 dedicated to producing that event. An event is then produced by that digital comparator 20 when the number output by the linear feedback shift register 10 matches the number placed on the event control lines of that comparator.

Figure 2:
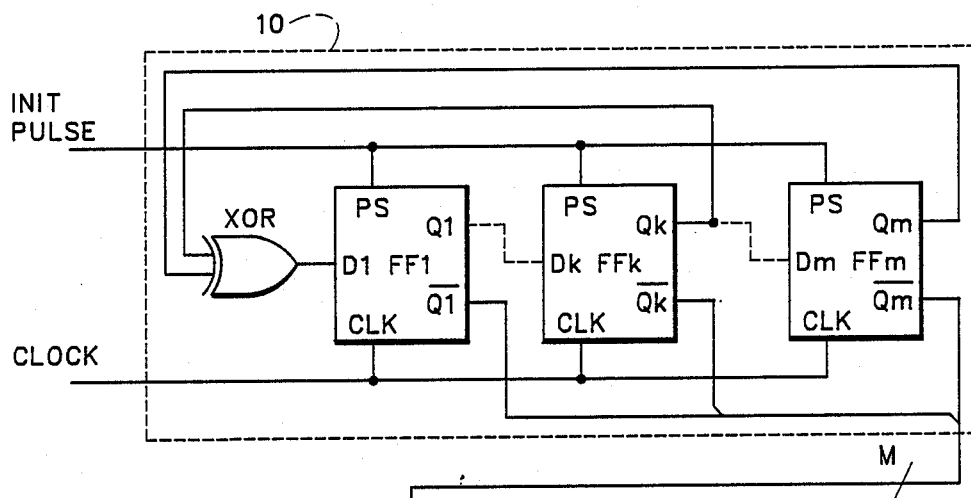
FIG. 2 is a schematic diagram of a preferred embodiment of the programmable multiple event generator of the invention.
Figure 2:
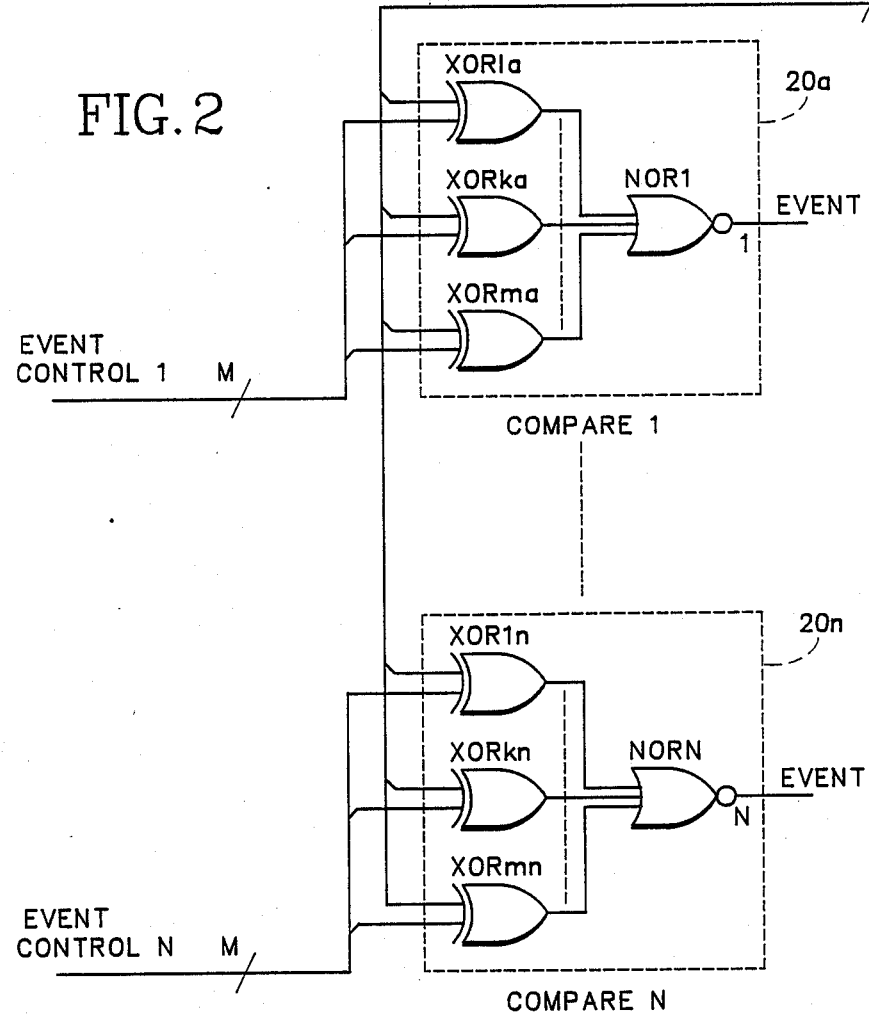

Referring to FIG. 2, in the preferred embodiment of the invention a series of flip-flops FFl, FFk, and FFm are connected Q output to D input to form the linear feedback shift register 10, with feedback to the input D1 of the first flip-flop FFl coming from an exclusive OR gate XOR whose inputs are connected to the Q outputs of each of the succeeding flip-flops FFk and FFm. The flip-flops FFl, FFk, and FFm of the linear feedback shift register 10 receive their clock inputs Clk from a Clock signal input. The initialization input, Init Pulse, is connected to the preset input PS of all of the flip-flops. The preset input PS is functionally equivalent to a second ORed D input, and a high on this PS input operates to set the flip-flop at the time of the Clock edge, the same way that a high on the D input would.

The Q-not outputs of the flip-flops FFl, FFk, and FFm are used to provide the numbers sequence output for the digital comparators 20a and 20n, while the Q outputs are used to provide feedback via the exclusive OR gate XOR. This is important because the maximum frequency of operation for a linear feedback shift register is:

$$F\text{-max} = 1/(T\text{-pdff} + T\text{-setup} + T\text{-hold} + T\text{-pdxor})$$

and the propagation delay through a device, T-pd, as measured at a particular output node is linearly proportional to the load on that node. If the output to the digital comparators were taken from the same node as the feedback signal, each digital comparator 20x added would slow down the operation of the linear feedback shift register 10. However, with the feedback and output being taken off different sides of the flip-flops (Q and Q-not), the speed of the linear feedback shift register 10 is not degraded by the addition of more digital comparators 20n to the output load.

Adding more digital comparators 20n to the output load will delay the occurrence of a particular event by increasing the propagation delay from the linear feedback shift register 10 to the digital comparator 20a or 20n, but this is a relatively minor total contribution to the delay of a particular event compared to the effect of slowing down the operation of the linear feedback shift register 10 and delaying the event by that propagation delay increase times the number of clocks in the sequence before that event is generated.

In the circuit of the preferred embodiment, the digital comparators are constructed of m exclusive OR gates and a single NOR gate whose inputs are the outputs of the exclusive OR gates. For example, in FIG. 2, the digital comparator 20a that generates Event-1 consists of NOR1 and XOR1a, XORka, and XORma.

In operation, the first exclusive OR gate XOR1a receives one of its two inputs from the first bit of the m bits of the number sequence output of the linear feedback shift register 10 and its other input from the first bit of the m bits of the first Event Control signal 1. The next exclusive OR gate XORka receives one of its two inputs from the next bit, the k bit, of the number sequence output of the linear feedback shift register 10 and its other input from the corresponding bit, the k bit, of the first Event Control signal 1. Similarly, the last exclusive OR gate XORma receives one of its two inputs from the last bit, the m bit, of the number sequence output of the linear feedback shift register 10 and its other input from the last bit, the m bit, of the first Event Control signal 1.

When every bit in the number sequence output of the linear feedback shift register 10 matches the corresponding bit in the first Event Control signal 1, the output of all three exclusive OR gates XOR1a, XORka, and XORma will be low and all inputs to the NOR gate NOR1 will be low, producing a high on its output, generating an Event-1.

Similarly, when every bit in the number sequence output of the linear feedback shift register 10 matches the corresponding bit in the last Event Control signal N, the output of all three exclusive OR gates XOR1n, XORkn, and XORmn will be low and all inputs to the NOR gate NOR1 will be low, producing a high on its output, generating an Event-N.

As has been indicated above, a linear feedback shift register 10 with M flip-flops generates a sequence of numbers which is 2expM−1 numbers long for most values of M. However, the signal Init Pulse can cause the shift register to be re-initialized to its starting value, truncating the sequence at any desired point.

Following an Init Pulse and a clock, the three bit linear feedback shift register 10 shown in the example of FIG. 2 would have a 111 on its Q outputs (the feedback path) and a 000 on its numbers sequence output (digital comparator input). The two 1's on the inputs of the exclusive OR produce a 0 on its output. Consequently, on the next clock the flip-flops will go to a 011 on their Q outputs and a 100 on their Q-not outputs. If uninterrupted, the succeeding clock pulses will cause the output to continue sequencing through the following states:

| Q-not Outputs | | | Feedback |
| --- | --- | --- | --- |
| FFl | FFk | FFm | XOR-out |
| 0 | 0 | 0 | 0 |
| 1 | 0 | 0 | 0 |
| 1 | 1 | 0 | 1 |
| 0 | 1 | 1 | 0 |
| 1 | 0 | 1 | 1 |
| 0 | 1 | 0 | 1 |
| 0 | 0 | 1 | 1 |

To cause Event-1 to occur three clock pulses after the Init Pulse, the event control signal controller (not shown) places a 011 on the Event Control 1 signal lines. When the output of the linear feedback shift register 10 reaches that value (011) all of the exclusive OR gates XOR1a, XORka, and XORma of the first digital comparator 20a will produce a low on their outputs causing the NOR gate NOR1 to produce Event-1 at its output.

Thus, the present invention provides a circuit that will operate at the highest possible speed and require a minimum amount of circuitry, yet generate multiple digital event signals whose timing relationships to a reference signal can be controlled. This circuit uses a linear feedback shift register to produce a sequence of arbitrary non-repeating numbers which are then monitored for the occurrence of particular numbers in the sequence by programmable digital comparators, which produce the desired event outputs when those numbers occur.

We claim:

1. A circuit for generating a plurality of digital events each on a separate signal line whose timing relative to each other and an initialization signal is programmable, comprising:
    means for producing at an output a numbers sequence composed of arbitrary non-repeating binary number, with the numbers in the sequence changing in a fixed progression through the sequence upon the occurrence of signals at a clock input and with the sequence being initialized to a starting point in the numbers sequence by the application of the initialization signal to an initialization input; and
    means for comparing the numbers sequence to a plurality of event control signals and generating a plurality of respective events when a match occurs between one of the numbers in the numbers sequence and one of the event control signals;
    such that the timing of the events relative to the initialization signal is programmable by the choice of values for the event control signals, and the absolute time associated with each number in the sequence is controllable by the frequency of the clock input to the producing means.

2. A circuit as recited in claim 1 further comprising means for producing event control signals having values appropriate to the desired timing of event outputs.

3. A circuit as recited in claim 1 wherein the producing means is a linear feedback shift register.

4. A circuit as recited in claim 3 further comprising means for producing event control signals having values appropriate to the desired timing of event outputs.

5. A circuit as recited in claim 3 wherein the comparing means is a plurality of digital comparators.

6. A circuit as recited in claim 5 further comprising means for producing event control signals having values appropriate to the desired timing of event outputs.

7. A circuit as recited in claim 5 wherein the linear feedback shift register comprises a plurality of flip-flops and an exclusive OR gate, with the exclusive OR gate coupled in a feedback path to the input of a first flip-flop from the output of the succeeding flip-flops.

8. A circuit as recited in claim 7 further comprising means for producing event control signals having values appropriate to the desired timing of event outputs.

9. A circuit as recited in claim 7 wherein the feedback for the first flip-flop is taken from one output of the succeeding flip-flops while the numbers sequence output for the digital comparators is taken from a different output of the succeeding flip-flops.

10. A circuit as recited in claim 9 further comprising means for producing event control signals having values appropriate to the desired timing of event outputs.

11. A circuit as recited in claim 9 wherein the digital comparators comprise a plurality of exclusive OR gates and a NOR gate, with each exclusive OR gate coupled to the one bit of the numbers sequence output of the linear feedback shift register and the same bit of the event control signal and with the outputs of all of the exclusive OR gates coupled to the inputs of the NOR gate and the output of the NOR gate being the event output of the digital comparator.

12. A circuit as recited in claim 11 further comprising means for producing event control signals having values appropriate to the desired timing of event outputs.

13. In a programmable digital circuit for producing multiple event outputs each on a separate signal line of the type having a counter for generating a number sequence and means for comparing the numbers in the sequence to a plurality of event control signals and generating a plurality of respective events when a match occurs between one of the numbers in the sequence of numbers and one of the event control signals, the counter being initialized by an initialization signal and counting upon the occurrence of clock signals, the improvement comprises replacing the counter with means for producing a numbers sequence output composed of arbitrary non-repeating binary numbers, with the numbers in the sequence changing in a fixed progression through the sequence upon the occurrence of the clock signals.

14. A circuit as recited in claim 13 wherein the producing means is a linear feedback shift register.

15. A circuit as recited in claim 14 wherein the linear feedback shift register comprises a plurality of flip-flops and an exclusive OR gate, with the exclusive OR gate coupled in a feedback path to the input of a first flip-flop from the output of the succeeding flip-flops 16. A circuit as recited in claim 15 wherein the feedback for the first flip-flop is taken from one output of the succeeding flip-flops while the numbers sequence output for the digital comparators is taken from a different output of the succeeding flip-flops.

* * * * *